Patented May 8, 1951

2,552,032

UNITED STATES PATENT OFFICE 2,552,032

SEPARATION OF PHOSPHORUS

Adrian Hadfield Booth, Deep River, Ontario, Canada, assignor to The Honorary Advisory Council for Scientific and Industrial Research, Ottawa, Ontario, Canada, a corporation of the Dominion of Canada No Drawing. Application June 17, 1948, Serial No. 33,667. In Canada February 17, 1948

6 Claims. (Cl. 23—223)

This invention relates to the separation of phosphorus from sulphur and more particularly to the recovery of the radioactive isotope of phosphorus of atomic weight 32 produced by the neutron irradiation of sulphur.

When sulphur is irradiated by neutrons it is transformed into phosphorus according to the reaction $S^{32}(n_1p) \rightarrow P_{32}$; that is to say the irradiated sulphur becomes phosphorus $P_{32}$. All of the sulphur is not necessarily transformed and separation of the desired isotope is necessary.

The object of the invention is to provide a convenient and effective method, which may be operated by remote control, for the recovery of this phosphorus.

In accordance with the invention, neutron irradiated sulphur is treated with one of a group of reagents consisting of alkyl mono carboxylic acids and their anhydrides, such as glacial acetic acid, propionic acid or butyric acid. The preferred reagents are saturated alkyl mono carboxylic acids. They should not be capable of dissolving a large amount of sulphur. Glacial acetic acid is preferred. A mixture of glacial acetic acid and acetic anhydride having a boiling temperature of 122° C. ±0.5° C. gives good results. Reagents having a higher boiling temperature may be used. The sulphur should be substantially carrier free or isotopically pure. It should be substantially free from iron and heavy elements.

The irradiated sulphur is heated with the reagent. Sulphur has a melting point of 119° C. The reagent preferably has a boiling point higher than the melting point of sulphur. Glacial acetic acid has a boiling point of 118° C. but this may be raised by the addition of acetic anhydride.

After heating to the boiling point of the reagent the mixture is agitated to achieve melting of the sulphur and facilitate extraction of the phosphorus. For example, air, nitrogen, carbon dioxide or other gas may be blown into the mixture.

Then the mixture is cooled and the reagent is decanted or filtered from the solidified sulphur which remains. If desired water may be added prior to filtration. After separation from the sulphur the extract solution is evaporated to dryness. Complete dryness is preferred since any acid or anhydride left promotes solution of the sulphur as a sol in the hydrochloric acid and is difficult to remove. Because sulphur is somewhat soluble in the acid reagent, some of it appears in the dry residue along with the acids of the recovered phosphorus. The latter are removed in practically pure form from the residue by leaching with a dilute acid, such as 0.1 N hydrochloric, nitric or sulphuric, but hydrochloric is preferred. In excess of 90° of the phosphorus may be recovered. The method may be carried out in glass apparatus under ordinary atmospheric pressure. It appears that the irradiated sulphur contains the phosphorus 32 in elemental form and the latter becomes oxidized in processing and is recovered in the oxide form.

The following examples are illustrative:

Example 1

3 grams of neutron irradiated sulphur was treated as described with three successive portions of 15 ml. of glacial acetic acid to extract the phosphorus.

The first portion of 15 ml. recovered 75% of the phosphorus.

The second portion of 15 ml. recovered 14% of the phosphorus making a total of 89%.

The third portion of 15 ml. recovered 2% of the phosphorus, making a total of 91%.

Example 2

A mixture of 3 parts glacial acetic acid and one part of acetic anhydride was used to extract the phosphorus and 2 ml. of such mixture was used per gram of sulphur in three successive extractions.

The first extraction recovered 71.9% of the phosphorus.

The second extraction recovered 14.6% of the phosphorus to a total of 86.5%.

The third extraction recovered 4.7% of the phosphorus to a total of 91.2%.

Example 3

The same mixture of acetic acid and acetic anhydride was used as in Example 2. Five milliliters of this mixture was used for each gram of sulphur treated.

The first extraction recovered 84% of the phosphorus.

The second extraction recovered 6.4% of the phosphorus to a total of 90.4%.

The third extraction recovered 2.5% of the phosphorus to a total of 92.9%.

It will be appreciated that, while it is preferable to heat the mixture to a temperature above the normal melting point of sulphur, excessively high temperatures promote solution of the sulphur, which is undesirable. Heating above 150° C. is undesirable because the sulphur becomes viscous. The preferred temperature range is 118 to 150° C.

Among the uses of the radioactive isotope of phosphorus, $P_{32}$, may be mentioned as a tracer in physiological studies, in the treatment of disease and in metallurgy. The present method is thus useful in facilitating such arts.

What is claimed is:

1. A method of extracting radioactive phosphorus values from neutron irradiated sulphur which comprises intimately mixing the material with one of a group of reagents consisting of alkyl mono-carboxylic acids, their anhydrides and mixtures of the two and heating the mixture to a temperature at least as high as the melting point of sulphur to extract $P_{32}$ into the reagent.

2. A method as defined in claim 1 wherein the mixture is heated at a temperature between 118 and 150° C.

3. A method of extracting radioactive phosphorus values from neutron irradiated sulphur which comprises mixing glacial acetic acid with the material and heating the mixture at a temperature at least as high as the melting point of sulphur and not in excess of 150° C. to extract $P_{32}$ into the acetic acid.

4. A method of extracting radioactive phosphorus values from neutron irradiated sulphur which comprises adding a saturated alkyl monocarboxylic acid to the neutron irradiated sulphur, agitating the mixture at a temperature between 118 and 150° C. to extract $P_{32}$ into the acid, separating the solution formed from the sulphur and evaporating the solution to dryness.

5. A method as defined in claim 4 wherein the dry product is leached with a dilute mineral acid.

6. A method as defined in claim 4 wherein the dry product is leached with dilute hydrochloric acid.

ADRIAN HADFIELD BOOTH.

REFERENCES CITED

The following references are of record in the file of this patent:

Mellor, Comprehensive Treatise on Inorganic and Theoretical Chemistry, vol. 8 (1928), pages 743, 783, 790; vol. 10 (1930) page 98, Longmans Green & Co., N. Y.